United States Patent [19]

Thornton et al.

[11] Patent Number: 4,674,925
[45] Date of Patent: Jun. 23, 1987

[54] GANG DRILL AND METHOD FOR CLEARING PATTERNS OF HOLES IN TUBULAR MEMBERS

[75] Inventors: Henry M. Thornton; John S. Thornton; Eugene A. Munchel; Richard E. Plowman, all of York, Pa.

[73] Assignee: Ashcombe Products Company, Dover, Pa.

[21] Appl. No.: 914,928

[22] Filed: Oct. 3, 1986

[51] Int. Cl.⁴ .............. B23B 35/00; B23B 41/00; B23B 39/16
[52] U.S. Cl. .............................. 408/1 R; 408/42; 408/46; 408/48; 408/53; 408/88; 408/234; 409/178
[58] Field of Search ............... 409/178; 408/1 R, 31, 408/42, 43, 46, 48, 52, 53, 55, 61, 79, 88, 103, 108, 127, 128, 234, 237

[56] References Cited

U.S. PATENT DOCUMENTS

| | | | |
|---|---|---|---|
| 529,712 | 11/1894 | Cristadoro | 408/128 |
| 1,329,663 | 2/1920 | Hill | 408/42 |
| 1,399,073 | 12/1921 | Pahmeyer et al. | 408/52 |
| 1,511,415 | 10/1924 | McEvoy | 408/92 |
| 1,559,359 | 10/1925 | Pahmeyer | 408/79 |
| 1,835,539 | 12/1931 | Thomas | 408/49 |
| 1,854,053 | 4/1932 | Millspaugh | 408/52 |
| 2,357,728 | 9/1944 | Anguera | 408/46 |
| 2,898,783 | 8/1959 | Kiesling | 408/88 |
| 2,988,934 | 6/1961 | Shlager | 408/88 |
| 3,124,977 | 3/1964 | Obear | 408/3 |
| 3,487,731 | 1/1970 | Coon | 408/79 |

FOREIGN PATENT DOCUMENTS 3466   8/1985   PCT Int'l Appl. ............ 408/53

Primary Examiner—Gil Weidenfeld
Assistant Examiner—Daniel W. Howell
Attorney, Agent, or Firm—C. Hercus Just

[57] ABSTRACT

A gang drill head having a row of drills spaced according to repeated patterns of holes in a tubular member such as a suction roll in a paper-making machine which are clogged and are to be cleared by drilling the same, the drill head being guided for longitudinal movement along a guide member positioned upon the roll for circumferential incremental movement to effect radial movements of the rotating drills for the full circumference of the roll and the head including longitudinal adjustment of individual drill supports in accordance with the spacings of the repeated patterns of holes in the roll. The individual drill chucks are rotated simultaneously and manually controlled linkage causes raising and lowering of the drill head by a fluid-operated unit.

19 Claims, 7 Drawing Figures

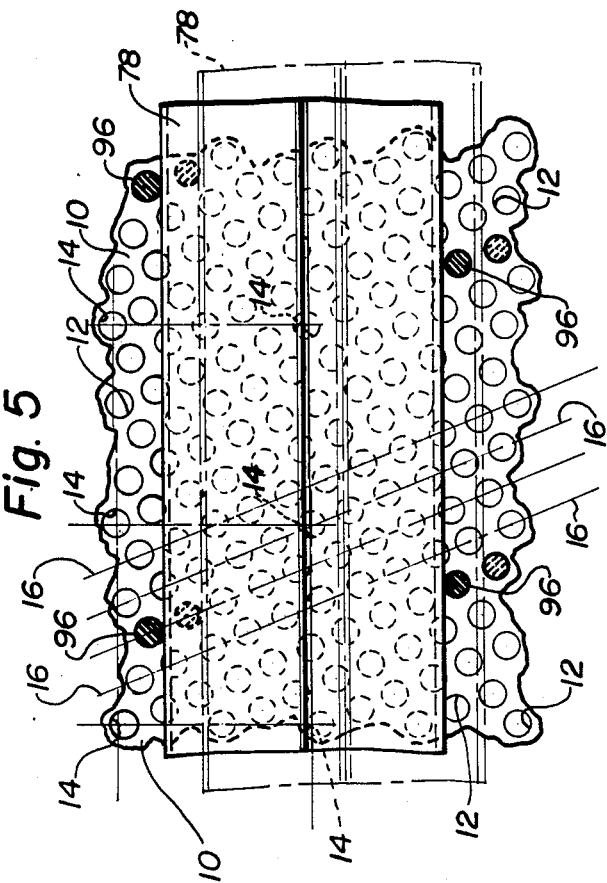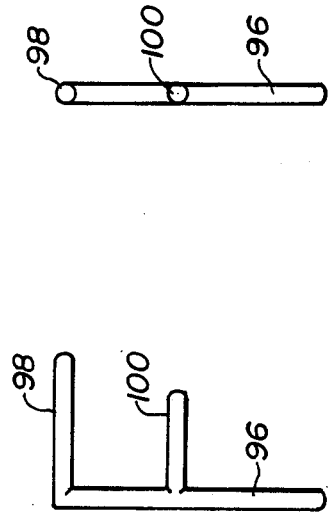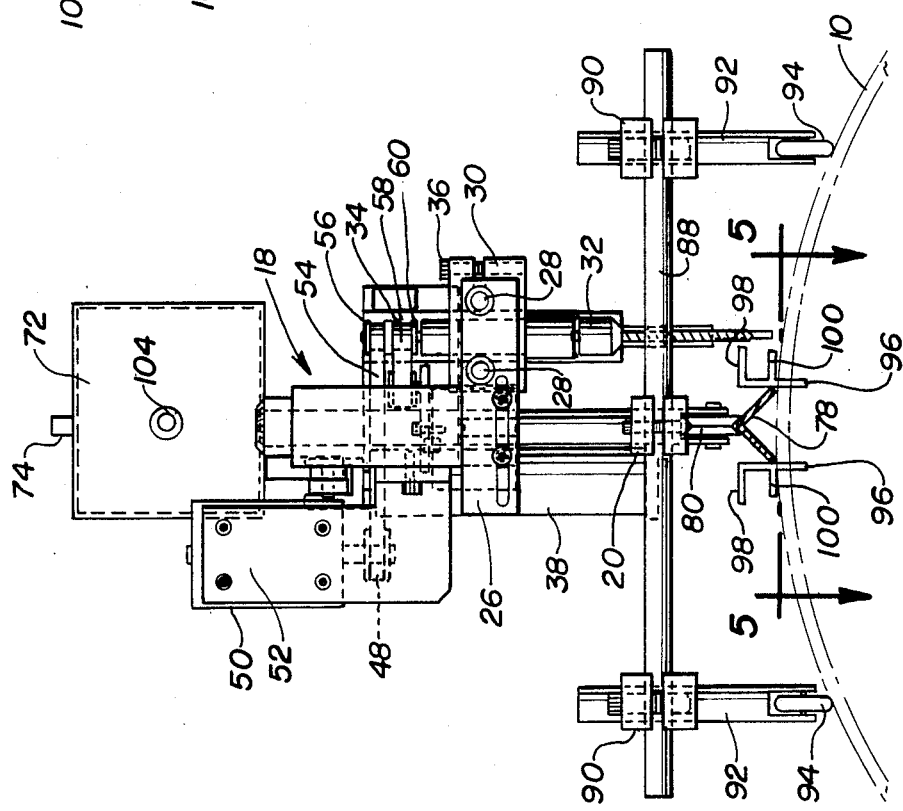

GANG DRILL AND METHOD FOR CLEARING PATTERNS OF HOLES IN TUBULAR MEMBERS

BACKGROUND OF THE INVENTION

This invention pertains primarily to a method and mechanism for removing clogged waste material from the holes in tubular suction rolls utilized in the paper-making industry but the present invention is not restricted to the clearing of holes and may be used to drill initial holes in tubular members. Suction rolls used in the stated industry vary in size from the order of eight or ten feet in length up to twenty feet and, in diameters from one foot or more to as much as three feet or more. In general, the walls of the suction roll may be as much as three or more inches and, in many instances, they are formed of metal, such as brass, and the exterior surface is covered with a limited thickness of rubber-like sheeting which is ground to a uniform surface. The rolls are used to extract water from the paper webs shortly prior to the same passing to dryer units and in the operation thereof, the water withdrawn from the paper webs includes particles of filler material, such as finely ground clay and otherwise, which tends to become collected in the patterns of multitudinous holes of relatively small diameter which are formed in the drum, such as in the order of one-eighth inch or possibly slightly larger, and ultimately said holes become more or less substantially clogged with such material. A common method of freeing the holes of the material is to employ groups of servicing personnel on opposite sides of a horizontally disposed clogged roll and by the use of individual electric drills, they are individually cleared of such compacted accumulations. Obviously, such operation is very time consuming for a substantial group of employees who otherwise could be usefully employed in production operations. It is the object of the present invention to provide mechanism and a method which at most requires only two operators using drilling equipment described in detail hereinafter, for purposes of much more rapidly freeing the holes of clogged material and restoring the same to useful life.

The principal piece of equipment utilized in the present invention and method comprising a part thereof is what is commonly known as a gang drill, but one which has been especially adapted to operate efficiently and beneficially in removing accumulated matter from the multitudinous holes in such aforementioned suction rolls. Gang drills in many forms have been developed heretofore. In general, those which have been previously devised have been designed for specific purposes. For example, prior U.S. Pat. No. 1,329,663 to Hill, dated Feb. 3, 1920, in which a single row of drills are operated by common means for simultaneous rotation of all of the drills by means of elongated chains engaging sprockets on the drill shafts. Prior U.S. Pat. No. 2,357,728, to Anguera, dated Sept. 5, 1944, illustrates another row of substantially spaced drill heads designed to simultaneously drill holes in chassis for vehicles or similar objects, the drills respectively being operated by individual electric motors connected thereto by belts.

Another prior U.S. Pat. No. 3,124,977 to Obear, dated Mar. 17, 1964, illustrates a gang drill designed to drill holes in railroad rails for purposes of connecting attaching plates thereto, and in this structure a single motor, by means of a plurality of chains operates gangs of three drills simultaneously. In view of the fact that suction rolls of the type in which the present invention in applicable are cylindrical, and the holes therein are radial, it has been found that in prior U.S. Pat. No. 1,835,539 to Thomas, dated Dec. 8, 1931, a gang of radially disposed drills have been provided for simultaneously drilling radial holes in a cylindrical object.

Also, other prior patents have been developed which utilize either a single or a limited number of drill heads in connection with drilling radial holes in cylindrical objects, the following patents illustrating examples of such previously devised machines:
U.S. Pat. No. 1,399,073—Pahmeyer et al Dec. 6, 1921
U.S. Pat. No. 1,511,415—McEvoy Oct. 14, 1924
U.S. Pat. No. 1,559,359—Pahmeyer Oct. 27, 1925

Having found none of the foregoing stuctures illustrated in the various patents to be applicable to the problems solved by the present invention, what is believed to be a novel type of gang drill and method of operating the same has been devised with the following objectives in mind.

SUMMARY OF THE INVENTION

One of the problems which lends complexity to designing a gang drill and method of operating the same for purposes of removing clogged material from the holes of a suction roll for the paper-making industry comprises the fact that the patterns of holes drilled initially in such rolls aim to provide as many holes as possible in the roll and to do this, for example, it has not been chosen to arrange the holes in rows parallel to the axis of the drum. Instead, the holes are arranged in closely spaced rows extending diagonally to the axis of the drum and a substantial number of such holes are arranged in specific patterns which are repeated both circumferentially, as well as longitudinally, on the drum, whereby only individual holes in each pattern are disposed in common rows parallel to the axis of the drum, and such individual common rows are spaced circumferentially relatively short distances, such, for example, of the order of 0.07 inches apart in a circumferential direction. Hence, to solve the drilling problem, the gang drill of the present invention has been designed to provide a plurality of identical drill heads in the form of blocks of uniform thickness which may be supported on suitable longitudinal support means and fixedly connected thereto in evenly spaced positions which correspond to the distance between identical holes in each pattern of holes formed in the drum throughout the entire area thereof.

In view of the substantial length of many commonly used suction rolls, one problem requiring solution comprises appropriate guide means attachable adjustably to the drum for purposes of guiding a row of evenly spaced drills having a length only a relatively small part of the overall length of the drum and substantially less than half the length of the drum, for example, and also providing means by which sections of a limited number of repeated patterns simultaneously can be drilled while the row of drills moves along a single elongated guide member, specifically in the form of an angle iron, and positioned with the angular ridge thereof uppermost and the outer edges of the flanges being in engagement with the upper surface of the drum, and the gang drill frame having anti-friction guide means, such as rollers, and formed in complementary manner to the guide ridge and supplemented by additional stabilizing rollers adjustably positioned on transverse members extending perferably in opposite directions from the frame which supports the row of drill chucks and bits, whereby the axis of the bits is maintained radially with respect to the drum.

Another object of the invention is to provide driven sheaves respectively on the upper ends of each drill head and these are driven by a similar drive sheave within the plane of the driven sheaves and a double-faced timing belt extends in serpentine manner around successive driven sheaves and the drive sheaves, whereby alternate chucks are driven reversely to those in between and accordingly, right and left-hand fluted drills are employed alternately in order that all of the drills may be rotated simultaneously.

A further object of the invention comprises the positioning of all of the drill heads upon a common longitudinal support means guided at opposite ends upon vertical parallel rods and linkage means operated by a fluid-operated cylinder unit operates the linkage means in a manner to raise and lower the drill heads simultaneously respectively in opposite directions to free the clogged holes of debris and return the drills to starting position out of the holes in the drum.

Still another object of the invention is to provide several embodiments of means to position the angle iron guide member with respect to the drum, one of these comprising quickly operated clamping means engaging opposite ends of the drum, while another means comprises a plurality of positioning pins insertable at spaced locations along opposite sides of the angle iron guide member and inserted in holes commonly disposed in successive patterns of holes in the drum. Due to the length of the angle iron guide member normally employed, it has limited flexibility, whereby in accordance with the method of operation of the apparatus, it is preferred that the frame which supports the drill heads is moved manually successively along various sections of the overall patterns of holes in the drum and after passing certain sections in the initial portion of the path of movement, the flexibility of the guide member permits a second operator to move the guide member circumferentially to dispose the same in alignment with the next row of holes in the assembled patterns which are to be drilled and after the drill heads have been restored reversely to the initial starting position, the far end of the guide member also then may be moved into alignment with the next successive row of holes to be drilled. Details of the foregoing objects and of the invention, as well as other objects thereof, are set forth in the following specification and illustrated in the accompanying drawings comprising a part thereof.

BRIEF DESCRIPTION OF THE DRAWINGS

FIG. 3 is a view of the gang drill mechanism shown in FIGS. 1 and 2 as seen from the side reverse to that illustrated in FIG. 1, and employing a larger scale than in FIG. 1, the same being illustrated in position upon a fragmentary portion of a suction drum, or the like.

FIG. 4 is an end view of the gang drill mechanism illustrated in the preceding figure and shown positioned upon guide means engaging a fragmentary portion of a suction drum.

FIG. 5 is a fragmentary plan view of a section of the perforated drum and guide means of the present invention applied thereto respectively in full line and phantom position to illustrate the use of one embodiment of a positioning and guide member otherwise illustrated in the preceding figures.

FIGS. 6 and 7 respectively are front and side views of one embodiment of positioning members for use in locating the guide member shown in FIG. 5 with respect to certain holes in successive, repeated patterns of holes in the drum.

DETAILED DESCRIPTION OF THE PREFERRED EMBODIMENT OF THE INVENTION

Figure 1:
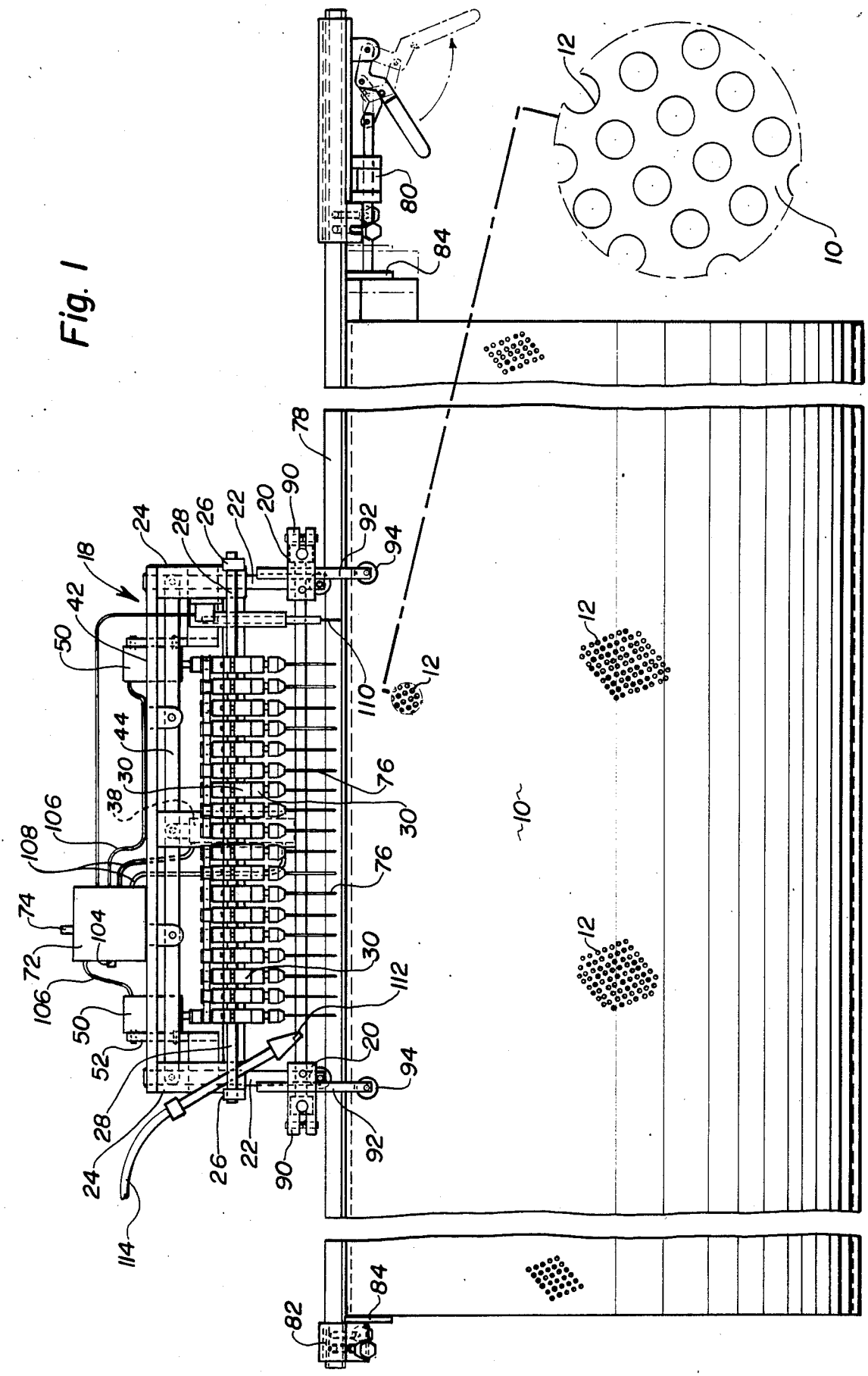
FIG. 1 is a side elevation of a gang drill mechanism embodying the principles of the present invention shown in operative position upon an exemplary suction roll of the type employed in the paper-making industry, said suction roll being foreshortened adjacent opposite ends to accommodate the same to the sheet.

Referring to FIGS. 1 and 3-5, especially FIG. 1, there is illustrated therein an exemplary suction drum 10 of the type to which the present invention is adapted for removing clogged material in the multitudinous patterns of holes provided in said drum, it being understood that the drum is substantially foreshortened as seen adjacent opposite ends thereof in view of the fact that drums of this type may be as much as twenty feet in length and three feet or more in diameter. Relatively small diameter holes 12 are formed therein in closely arranged patterns of which a typical exemplary illustration thereof is shown in FIG. 5 and in which so-called corner holes 14 are designated, it being understood that said patterns are repeated as much as necessary, both circumferentially and longitudinally of the drum 10, especially for purposes of affording maximum suction function. In view of the fact, however, for example, that some of the larger sizes of drums have a thickness of approximately three or more inches and the holes 12 extend radially thereinto, crowding of the overall arrangement of the holes beyond that shown in exemplary manner in FIG. 5 is limited. It also is to be understood that while an exemplary suction drum is shown in the drawings, the present invention also could be adapted to drill holes in certain desired patterns in tubular members of other types as distinguished from only removing accumulated material in the holes of a suction drum by drilling the same therefrom with drill bits.

Further referring to FIG. 5, it also will be seen that the holes 10 are of uniform size with the corner holes 14 and, further, the holes are all arranged in parallel rows, indicated by lines 16 thereof and the holes are uniformly spaced along said lines and this is of assistance in positioning a guide member described hereinafter successively in circumferential position in accordance with specific holes common to each pattern, and described in greater detail hereinafter.

The drill assembly or gang drill of the present invention comprises a longitudinal frame 18 composed of a series of elongated members connected together at the ends thereof by end members 20, said end members also include vertical guide posts 22, upon which guide blocks 24 are slidably mounted vertically. The guide blocks 24 also include transversely extending end members 26 between which a pair of elongated support members in the form of rods 28 extend and upon which a plurality of identical support blocks 30 are mounted.

Figure 2:
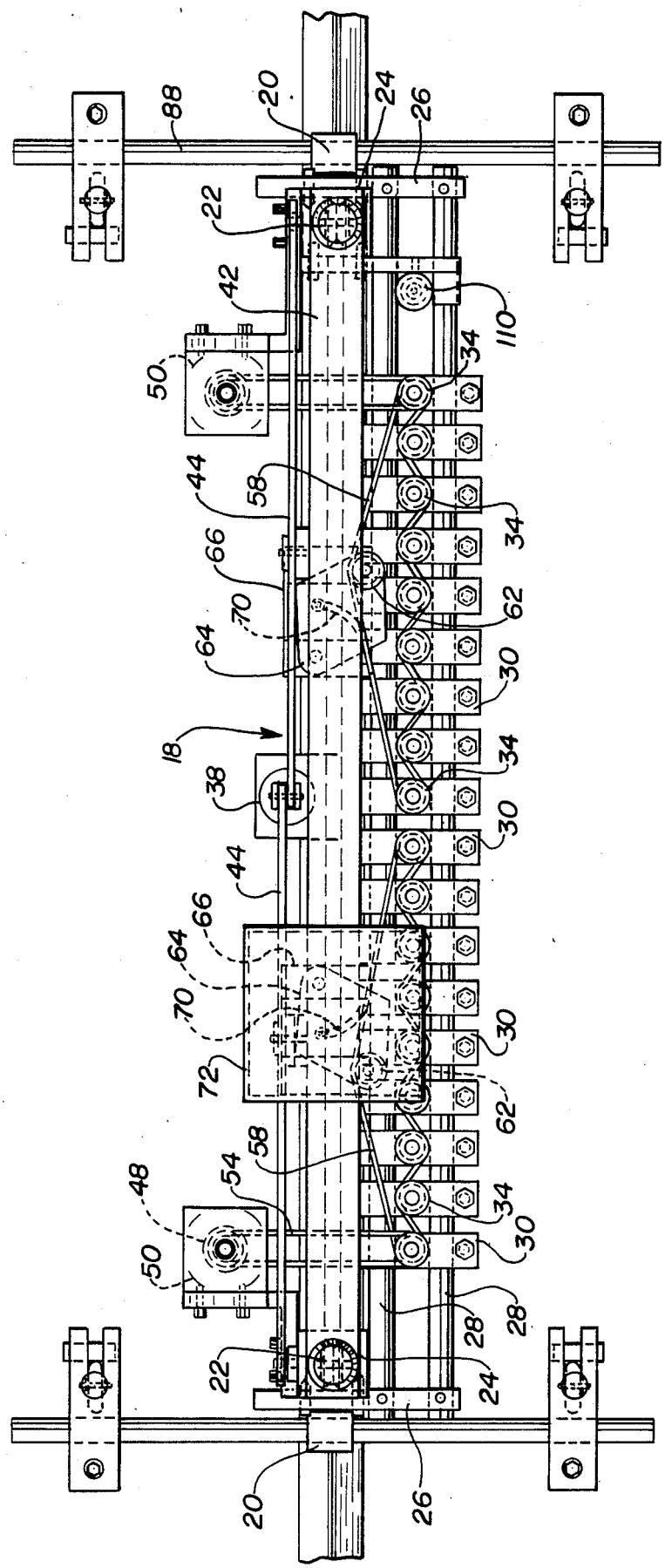
FIG. 2 is a top plan view of the gang drill mechanism shown in FIG. 1, but illustrated on a larger scale than in FIG. 1, and the drum illustrated in FIG. 1 not being included in FIG. 2.
Figure 3:
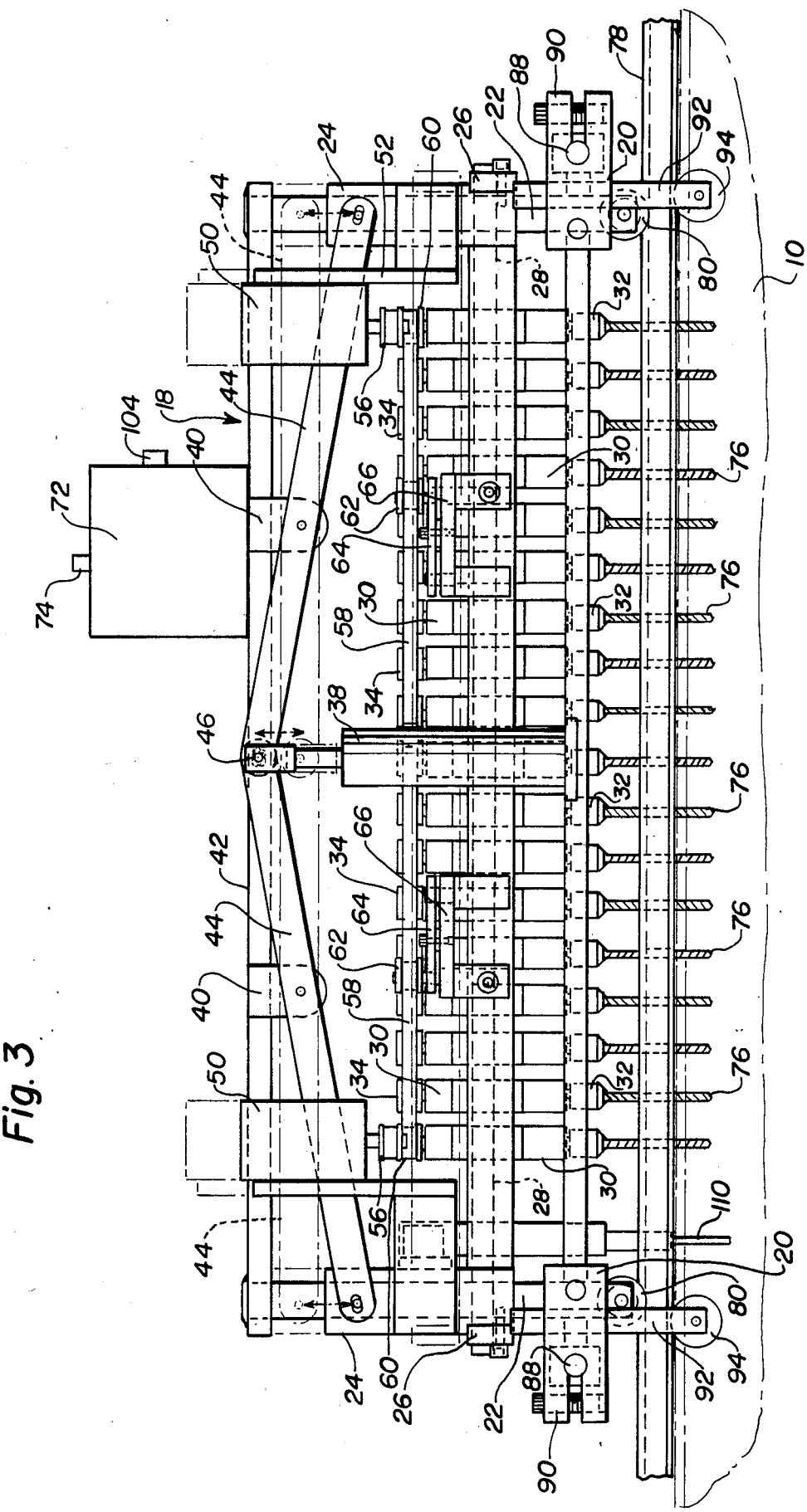

The support blocks 30 extend horizontally, as well as vertically, as can be seen respectively from FIGS. 2 and 3, and the same support shafts in suitable bearings upon opposite ends of which there are respectively mounted drill chucks 32 and driven sheaves 34. In view of the fact that the support blocks 30 are of identical thickness particularly, it is readily possible to position the same upon the support rods 28 in micromatically spaced relationship simply by means of inserting a thickness gauge of desired dimension between each pair of the blocks 30 as they are positioned upon the rods 28 and are securely clamped thereto by means of clamping bolts 36, see FIG. 4, which extend between split portions of the support blocks 30 in conventional manner.

Supported fixedly upon the longitudinal frame 18, intermediately of the ends thereof, is a fluid-operated cylinder unit 38. Fixed to and supported by the upper longitudinal frame member 42 is a pair of longitudinally spaced pivot brackets 40, the pivot brackets 40 respectively pivotally support elongated links 44, one end of each of which is pivotally connected at 46 to the upper end of the piston of the cylinder unit 38, while the opposite ends of said links respectively are connected to the guide blocks 24, which are slidable upon guide posts 22, the upper ends of which are fixed to the longitudinal frame member 42. By this arrangement, as the piston rod of cylinder unit 38 reciprocates, it respectively raises and lowers guide blocks 24 and thereby correspondingly raises and lowers the longitudinally spaced series of support blocks 30 which are mounted upon the support members 28.

The chucks 32 are rotated simultaneously by means of a drive sheave 48 mounted upon the shaft of a motor 50, supported by a bracket 52, connected to one end of the frame 18, as best shown in FIGS. 2 and 4. Sheave 48, by means of a timing belt 54, or the like, drives one section of a double sheave 56, see FIG. 4, and extending around the other portion of the double sheave 56, is a double-faced timing belt 58, which extends in serpentine manner successively around the driven sheaves 34. Due to the substantial number of support blocks 30 and the drill chucks 32 supported by the machine to shorten the time in which all holes in a suction drum may be drilled free of accumulation, the present invention preferably includes two of the motors 50, as clearly shown in FIGS. 2 and 3, and correspondingly two of the double sheaves 56 respectively driven thereby comprise drive sheaves 60, as well as an additional double-faced timing belt 58, the lugs of which mesh with serrations on the driven sheaves 34 affixed to the upper ends of the shafts upon which the chucks 32 are mounted.

For purposes of increasing the efficiency of gripping action between the double-faced timing belt 58 and the driven sheaves 34, each of the timing belts 58 is provided with a belt-tightening sheave 62, supported upon horizontal plates 64, see FIGS. 2 and 3, said plates being pivotally connected at one corner to horizontal brackets 66 that are fixed to longitudinal member 68, which is part of the mechanism that is affixed to guide blocks 24 and therefore, is reciprocated vertically by the action of cylinder unit 38 and the links 44, as best shown in FIGS. 2 and 3. As shown in FIG. 2, the horizontal plates 64 which support the tightening sheaves 62, each have an arcuate slot 70, see FIG. 2, in which a tightening bolt is operable to secure the plate 64 in any desired tightened position.

A control box 72 is mounted upon the upper longitudinal frame member 42 and has a manually-engagable switch button 74 thereon for purposes of operating a solenoid or the like, not shown, within the box 72 and to which the cylinder unit 38 is connected by means of conduits or the like, not shown, but of conventional nature, for purposes of controlling the raising and lowering of the vertically movable master head upon which all of the support blocks 30 are mounted together with the drill chucks 32, and the drills 76 mounted therein. By reason of the fact that the driving belt 38 extends in serpentine manner successively around adjacent driven sheaves 34, alternate chucks are driven oppositely to those in between but uniform drilling by all of the drills 76 is effected by the use of alternate left and right-hand fluted drills, as can be seen by the successive drills 76 illustrated in FIG. 3.

The manner in which the longitudinal frame 18 and all of the drilling equipment supported thereby is supported and guided upon the exemplary suction drum 10 is of paramount importance in the present invention and basically comprises an elongated guide member 78 which also supports the overall gang drill device. Referring to FIG. 4 in which guide member 78 is shown in section, it will be seen that the same comprises an elongated angle iron the length substantially equal to that of the suction drum 10, the same is positioned preferably upon the uppermost portion of the drum 10 when disposed horizontally and the angle iron rests upon the drum with the angle ridge thereof uppermost while the outer ends of the flanges directly engage the outer surface of the drum 10, as clearly shown in FIG. 4. Alternate means for securing the guide member 78 sequentially in circumferentially spaced positions upon the drum 10 are provided by the present invention, one of which means is shown in FIG. 1, and in which a toggle-operated clamping unit 80 is secured to one end of member 78, while an abutment member 82 is fixed to the opposite end of member 78, whereby said clamping means may be quickly operated for the purpose of shoes 84 thereon respectively engaging opposite ends of the drum 10.

From FIG. 4, in particular, it will be seen that the longitudinal frame 18 and all of the mechanism mounted thereon is supported upon the elongated guide member 78 by means of guide and support rollers 86, which are grooved in complementary manner to the angular ridge of the upper edge of the guide member 78, a pair of such rollers respectively being mounted adjacent opposite ends of the frame, as clearly shown in FIG. 3. To stabilize the frame upon the guide members 78 and prevent the same from tilting in either direction from the radial with respect to the drum 10, the opposite ends of the frame support horizontal members 88 which extend transversely with respect to end members 20 of frame 18, the members 88 preferably extending equal distances in opposite directions from the end members 20. Supported adjustably on opposite end portions of the transverse members 88 are slidably adjustable blocks 90 through which vertical posts 92 extend in a vertically adjustable manner, the lower ends of said posts respectively supporting rollers 94, which preferably engage the exterior surface of the drum 10 in equally adjusted manner, as clearly shown in FIG. 4. Such arrangement also enables the device to be supported equally well upon drums or cylindrical tubes or the like, of different diameters and such adjustment is accomplished by vertically moving the posts 92, as desired, as well as horizontally moving the adjustable blocks 90 upon the transverse members 88.

An alternate and preferred method of supporting the elongated guide member 78 upon the uppermost portion of drum 10 is best illustrated in FIGS. 4–7. In FIGS. 6 and 7, plan and side elevations respectively are shown of a preferred form of manually operable positioning pins 96 of which a plurality are used for insertion into selected holes 12 formed of uniform diameter in the drum 10 in the manner described in detail hereinabove, especially as illustrated in FIG. 5. The pins 96 have a manually-engagable upper end 98 and spaced downwardly therefrom is a shorter abutment member 100 on pin 96 for insertion respectively in holes on opposite sides of the guide members 78, as illustrated in exemplary manner in FIG. 4. When fully inserted into selected holes, the abutment members will engage the outer surface of the drum 10 and thereby limit the insertion, as well as insuring that the manually-engageable upper ends 98 will be spaced from the drum and thereby are in position for ready manual gripping so as to remove the pins 96 from the holes.

The function of the positioning pins 96 is best illustrated in FIG. 5 with respect to the repeated patterns of holes within the drum 10, the so-called corner holes 14 defining each pattern being shown in said figure. When the guide member 78 that is illustrated in full line in FIG. 5 is positioned on drum 10, it is secured in said position by the cross-sectioned pins 96 which are longitudinally spaced at opposite side edges of the member 78 and effectively locate and position the member 78 thereon so that the entire row of drill bits 76 will simultaneously drill a single specific hole of each pattern of holes for a longitudinal section of the entire pattern of holes on the drum, assuming that the drum is substantially longer than the length of the row of bits 76, as shown in FIG. 3, for example. By way of specific example for illustrative purposes, it can be assumed that the row of drill bits 76 is approximately two feet in length, whereas the drum 10 may, for example, be twenty feet long. Accordingly, it can be seen that the row of bits 76 can be operated successively to drill a section of the specific holes intended to be drilled and when the drills are elevated from said section of holes, the entire frame with the drills thereon, is moved longitudinally along the guide member 78, until the last drill, for example, is positioned directly over the first hole of the next section of holes which is to be drilled, and then the drills are lowered in the manner described above to effect such drilling. Such continuous repositioning of the frame with respect to successive sections of the holes is undertaken until an entire row thereof along the full length of the drum has been drilled. The next requirement is to move the guide member 78 circumferentially and evenly in one direction along the surface of drum 10 to dispose the same, for example, in the phantom position of member 78 as shown in exemplary manner in FIG. 5.

Such repositioning of the guide member 78 is facilitated by virtue of the fact that a substantial length thereof, such as can be employed upon a substantial range of lengths of suction drums, has limited flexibility and, while an operator is physically moving the longitudinal frame and drills along the guide member and successively drilling sections of specific holes in patterns thereof, a second operator may commence limited circumferential movement of the end portion of the guide member 78 to the next intended position thereof for drilling the next successive row of holes by first removing the pins 96 from the first-mentioned holes and inserting them in the desired holes of the next row with which the guide member 78 is to be positioned. Customarily, by way of specific example, the positioning pins 96 need only be placed in engagement with opposite edges of the guide member 78 at intervals of two or three feet, but such dimension is merely exemplary.

When the first operator has reached the far end of the guide member 78 upon which the frame and drills have been moved successively to sections of said holes, said operator then returns the frame and drills to the initial starting position and proceeds to repeat the drilling operation while the frame is moving along the new position of the guide member 78 and at this time, the opposite end of the guide member may be removed from the first-described position to the new position on the drum relative to the new row of holes into which the positioning pins 96 are inserted for the full length of the new holes. This operation is continued successively upon additional rows of holes specifically in the repeated patterns thereof until all of the holes in the drum have been drilled. To facilitate such accomplishment and also to maintain the overall frame and drills substantially in the uppermost location of the drum 10, it is preferred that especially drums of large diameter be supported at the ends thereof in suitable trunnions or the like, and periodically after a limited number of rows of holes have been drilled, the drum may be rotated in the desired direction in order to maintain the drilling along the uppermost portions of the drum.

For purposes of controlling the operation of the electric motor 50, any suitable means, such as a start-and-stop switch 102 also may be positioned in control box 72 and appropriate power lines 106, see FIG. 1, extend between said switch and the respective motors 50. Similarly, FIG. 1 also illustrates fluid supply and return lines 108 which extend between opposite ends of the fluid-operated unit 38 and the solenoid switch therefor within control box 72.

Additional features for convenience which are included in the invention comprise, for example, a probing prong 110, shown in FIG. 1, adjacent the right-hand end of the frame and also adjacent the left-hand end of the frame in FIG. 3. It will be seen from these figures that the lower end of said prong is longer and extended downward a greater distance than the tip ends of the drills 76. Such prong is useful in locating the frame 18 and the drills 76 in successive sections of the rows of holes to be drilled, such as when one of such sections has been drilled and the frame and drills are to be moved to the next successive section, the prong 110 preferably is located a predetermined distance from the nearest drill 76, such as of the order of two spaces between successive drills 76, whereby the prong may be positioned directly above the next to the last drilled hole in the section thereof just drilled, and thereby locate automatically the row of drills directly above the next section of holes to be drilled thereby.

Still another convenient feature of the present invention comprises providing an air jet to be discharged from a nozzle 112, shown in FIG. 1, and connected by hose 114 to a suitable supply of air or the like under pressure, and being operable especially during the return movement of the frame 18 and drills thereon to the starting position at the first end of the drum, thereby blowing away any accumulated drilling chips adjacent any of the drilled holes and thus, maintaining the outer surface of the drum relatively free of such chips. Any control valve of suitable nature, not shown, may be included in the hose 114 to effect operation of the air jet 112 during such return movement of the frame and drills while the drills are in retracted position.

From the foregoing, it will be seen that the present invention comprises drilling equipment of a nature adapted to speed up the drilling of accumulated and clogging material from the suction holes in a suction drum of the type employed in papermaking machinery, as compared with the very time-consuming manual employment of a substantial number of operators with individual drill heads operated by them at opposite sides of the drum or otherwise. By the use of the present invention, the failure to drill any particular holes is practically eliminated as occasionally occurs in current manual drilling of such holes. The positioning of guide means with respect to the drum for operation on successive rows of holes in patterns thereof also is of readily operated nature for accurate incremental circumferential repositioning of the guide means upon the drum.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. Drill mechanism operable to support a row of drill bits for radial operation in holes formed in or to be formed radially in a tubular member in repeated patterns to provide overall close spacing of holes to be formed therein or cleared of accumulations therein, said mechanism comprising in combination, an elongated frame, a row of drill chucks supported upon said frame for longitudinal adjustment along elongated support members on said frame, guide means for said frame positionable longitudinally upon a tubular member in successive circumferentially spaced positions according to rows of holes in repeated patterns thereof in or to be formed in said tubular member and along which guide means said frame is successively positionable between opposite ends of said tubular member, means operable to raise and lower said elongated support members for said chucks to cause drill bits in said chucks to drill holes in said tubular member or clear the same of accumulations therein, means engageable with said tubular member and operable to stabilize said guide means in successive circumferentially spaced locations thereof upon said tubular member, and power means on said frame operable to rotate said drill chucks and bits simultaneously in drilling directions.

2. The drill mechanism according to claim 1 in which said guide means comprises an elongated ridge member and said frame having guide rollers complementary in shape to said ridge member and engageable therewith to guide said frame longitudinally along said tubular member in parallelism with a row of holes being drilled in said tubular member.

3. The drill mechanism according to claim 2 further including supplemental guide means on said frame extending laterally from at least one side of said frame and engaging the surface of said tubular member and operable to maintain the axes of said drill chucks and bits therein radial with respect to said tubular member.

4. The drill mechanism according to claim 3 in which said supplemental guide means comprise transverse members at opposite ends of said frame, and vertical post members on the ends of said transverse members adjustably positionable relative thereto toward and from said tubular member, and anti-friction means on the ends of said post members nearest the tubular member and engageable therewith.

5. The drill mechanism according to claim 1 in which said elongated support members comprise a pair of parallel rods extending between opposite ends of said frame, and said drill chucks being mounted upon support blocks of uniform width slidably adjustable upon said rods and including means to secure said blocks in adjusted positions upon said rods.

6. The drill mechanism according to claim 5 in which said frame also includes perpendicular guide posts at opposite ends and the ends of said parallel rods being fixed to guide blocks slidable on said guide posts, a fluid-operated cylinder unit supported upon said frame, and linkage means pivotally-supported upon said frame and interconnected to said cylinder unit and guide blocks and operable to move said parallel rods and chuck support blocks thereon toward and from tubular members to effect drilling of holes therein or clearing clogged holes previously formed therein.

7. The drill mechanism according to claim 6 in which said linkage mechanism comprises a plurality of similar elongated rod-like links pivotally connected intermediately of the ends thereof to said frame, one end of each link being connected to the piston of said fluid-operated unit and the opposite ends of said links being connected pivotally to said guide blocks.

8. The drill mechanism according to claim 5 in which said support blocks for said drill chucks have rotatable shafts connected at one end to said chucks and the opposite ends each having a driven sheave fixed thereto, and said mechanism also including a powered drive sheave supported by said frame, manually operable control means for said powered drive sheave, and belt means extending around said drive sheave and all the driven sheaves and operable simultaneously to rotate said driven sheaves and the chucks supported by said blocks and connected to said driven sheaves.

9. The drill mechanism according to claim 8 further characterized by said powered drive sheave being connected to an electric motor, said driven sheaves being in a straight row, said belt means being a double-faced timing belt arranged serpentine-like successively around said driven shafts and drive shafts, whereby alternate sheaves are rotated in the opposite direction from those in between the alternate ones, and said driven sheaves supporting alternately left and right-hand fluted drill bits.

10. The drill mechanism according to claim 9 further including belt-tightening pulley means engaging said double-faced timing belt.

11. The drill mechanism according to claim 1 further including a pilot prong in line with drill bits in said drill chucks and the lower end thereof projecting closer to said tubular member than the tips of the drill bits, said prong being operable to engage the last hole in a row which has been drilled when the frame is advanced to the next successive group of holes to be drilled under circumstances where the row of drill bits is of less length than the tubular member being drilled and thereby accurately position the row of drill bits relative to the desired section of a row of holes in the pattern thereof in the tubular member before rotation of the drill bits is initiated.

12. The drill mechanism according to claim 1 in which said guide means is an elongated track-like member extending between opposite ends of the tubular member to be drilled and adapted to be positioned upon the uppermost portion of said tubular member when the same is positioned substantially horizontally, and clamping means mounted on opposite ends of said track-like member and grippingly engageable with said opposite ends of said tubular member to position said track-like member successively in circumferentially spaced positions on said tubular member to guide said frame and drilling means thereon longitudinally along said tubular member.

13. The drill mechanism according to claim 1 in which said guide means is an elongated section of angle iron adapted to be positioned upon the uppermost surface of said tubular member with the angle ridge uppermost and the edges of the flanges engaging said tubular member for support thereby, and stabilizing positioning members engageable respectively with opposite edges of said angle iron at longitudinally spaced locations along said tubular member, said positioning members comprising a pin insertable in selected holes in said tubular member on opposite sides of the flanges of said angle iron.

14. The drill mechanism according to claim 13 in which said positioning members have a laterally extending manually engageable end member and a second laterally extending member spaced below said end member and adapted to engage the surface of said tubular member to limit the insertion of said pins into holes in said tubular member.

15. The drill mechanism according to claim 1 further including an air nozzle upon one end of said frame and connected to a source of air under pressure, said nozzle being positioned to discharge drilled particles from the top of said tubular member when said frame is moved therealong.

16. A method of removing material clogged in multitudinous holes in a tubular suction roll in paper-making machinery comprising the steps of:
 a. mounting an elongated guide member upon the substantially uppermost surface of the suction roll when positioned substantially horizontally upon supporting means, the guide member being parallel to the axis of the roll and maintained in a selected position by positioning means engaging said suction roll at spaced locations,
 b. mounting upon said guide member a frame upon which a limited length of row of chucks and drill bits thereon are mounted for simultaneous rotation,
 c. aligning said bits with a portion of a selected row of holes in said tubular member disposed in a straight line parallel to the axis of said member and spaced longitudinally in a pattern of said holes according to the spacing of said bits,
 d. lowering said bits while rotating into the holes of the selected row thereof to engage and remove clogged material in said holes,
 e. retracting said bits from the holes which have been cleared of said clogged material,
 f. moving said frame along said guide member to align the bits thereon with a successive section of the same row of holes and repeating the foregoing drilling and removal steps until the entire selected row of holes has been cleared of clogged material,
 g. while the frame is successively moved along the guide member toward the far end thereof commencing re-inserting said positioning means in the next successive row of holes to be drilled until the frame has reached the far end of the guide member,
 h. returning the frame to the starting end of the guide member and commence drilling the holes of said sections of the next successive row of holes while completing the positioning of the guide means in the far end section of said next successive row of holes, and
 i. repeating said re-positioning of said guide means relative to row after row of said holes to be drilled.

17. The method according to claim 16 including the further step of gradually rotating said suction roll upon its support to maintain the drilling means on the uppermost surface portions of said roll.

18. The method according to claim 16 including the further step of applying a blast of air from the trailing end of the frame along the row of holes which have just been drilled to remove drilling chips from the surface of the suction roll.

19. The method according to claim 16 including the further step of aligning with the last hole drilled in a preceding section of holes a pilot prong on said frame which extends farther from the frame than the tips of the drill bits, whereby such positioning of said pilot prong automatically positions all the drills with the undrilled holes in the next section to be drilled.

* * * * *